Jan. 16, 1934. R. R. GRAVES 1,944,079
CONSTRUCTION OF INSULATED WALLS
Filed Feb. 24, 1932
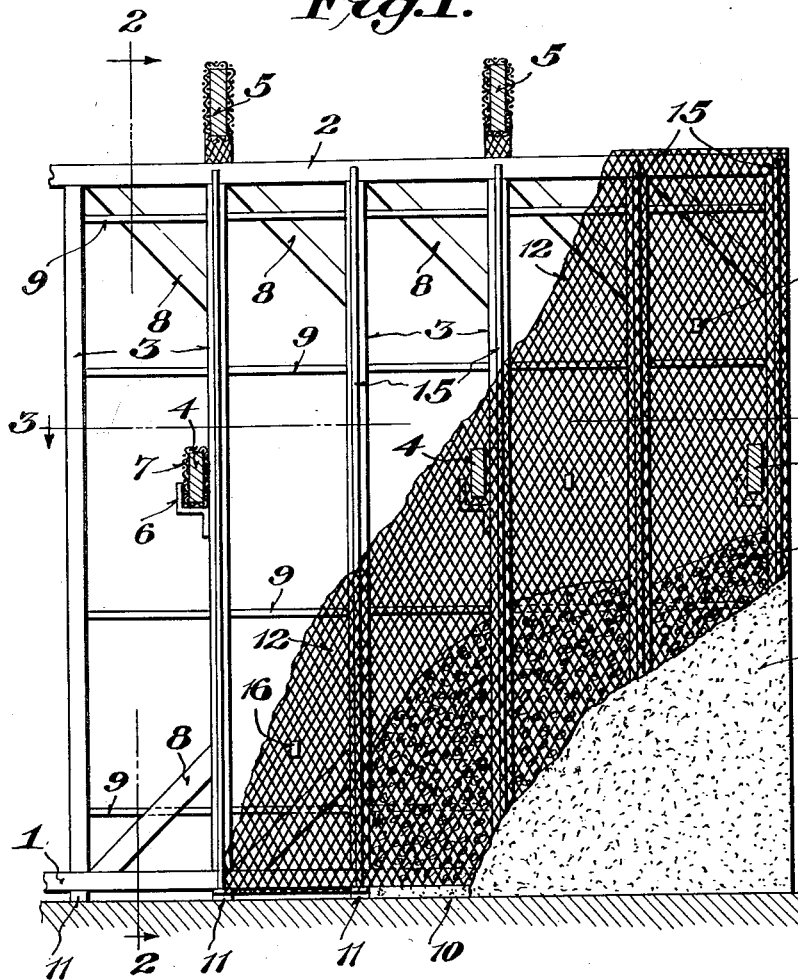
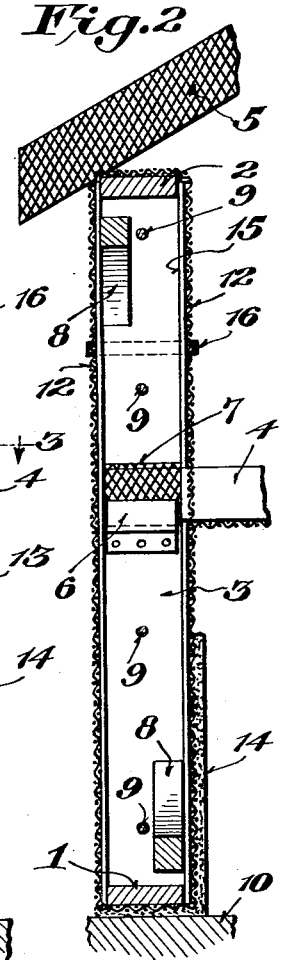
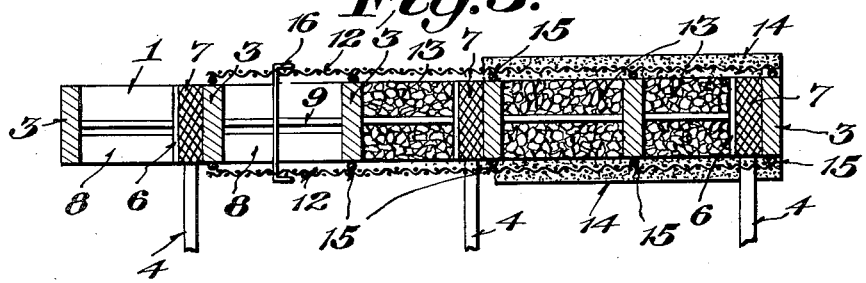
Inventor
Roy R. Graves,
By K. P. McElroy
Attorney Patented Jan. 16, 1934

1,944,079

UNITED STATES PATENT OFFICE 1,944,079

CONSTRUCTION OF INSULATED WALLS

Roy R. Graves, Kensington, Md.

Application February 24, 1932. Serial No. 594,912

10 Claims. (Cl. 72—16)

This invention relates to construction of insulated walls; and it comprises a process of constructing an insulated wall by the steps of erecting a framework comprising the usual sill, studs and plate, covering said framework on both sides with a reinforcing mesh, filling the space between said studs and said reinforcing mesh with a heat insulating material in loose form, removing, if desired, a layer of insulating material adjacent said reinforcing mesh and applying a layer of cement over said reinforcing mesh in such manner that a substantial portion penetrates into said insulating material, thereby forming an interlocking engagement between said material and said cement; and it also comprises a wall having a framework including the usual studs, sill, plate, etc., said framework being enclosed by reinforced cement coatings forming outer surfaces of said wall, the space between said cement coatings and said studs being filled with a heat insulating material in loose form, for example with peat moss and the said insulating material being in interlocking engagement with said concrete coatings; all as more fully hereinafter set forth and as claimed.

The desirability of heat insulated walls and buildings has long been recognized. In fact it has been estimated that fully one-half of the heat lost by radiation from the buildings of usual construction passes through the walls and roofs. The high cost of building heat insulated houses has, however, been so high as to be almost prohibitive.

A large number of suggestions have been made for the construction of heat insulated walls. It has, for example, been proposed to employ bales of straw and other heat insulating materials between walls of concrete or plaster. Cellular concrete structures have been proposed, the cells being filled with insulated materials. A few constructions have even been proposed for employing loose insulating materials.

The use of baled or blocked material for wall construction has many disadvantages. The bales or blocks must be made specially for the purpose and at a considerable expense. It is difficult to fit the bales properly, especially if crossed joints are used. It is necessary to either employ bales of various sizes or to cut bales to fill in. Loose material of the same weight provides better heat insulation. The joints between bales cannot be made tight and tend to reduce the heat insulation obtained. There are invariably interstices left, not only between bales but also between the bales and any side walls which may be used, which promote the spread of rodents and other vermin and reduce both the heat insulation and the fireproofness of the structure.

While loose materials have many advantages for heat insulation, their use introduces new complications. As usually employed there is a considerable amount of settling or packing with the resultant spotty insulation. In order to reduce this tendency, it is necessary either to use this type of insulation in rather thin layers or to use other special expedients.

I have found that, if loose insulating material of a certain type is employed, any tendency to settle may be obviated by the simple expedient of providing an interlacing or interlocking engagement between cement side walls or coatings and the insulation. In what I consider the best embodiment of my invention my wall is constructed by covering the usual studs with metal lath or reinforcing mesh, the space between the studs then being filled with loose insulating material which is tamped into place. It is then advantageous to dislodge or remove part of the layer of insulating material which is adjacent the reinforcing mesh by brushing the mesh or by suction. Cement may then be applied to the mesh, taking care to force as much as possible through the mesh and into the insulating material. The cement enters the interstices between the loose particles of the insulation forming an interlocking engagement which tends to support the insulation as well as to effectively prevent settling.

My invention can be more readily described in connection with the accompanying drawing which shows, for purposes of illustration, a wall structure within the scope of my invention. In this showing:

Fig. 1 is a front elevation of a wall constructed in accordance with my invention with parts broken away to show the complete structure.

Fig. 2 is a vertical section along the line 2—2 of Fig. 1,

Fig. 3 is a horizontal section along the line 3—3 of Fig. 1, while

Fig. 4 is an enlarged partial view in section showing the inside cement mortar facing of the wall and its interlocking engagement with the insulating material.

In the figures like structures are indicated by like numerals. The framework of the wall illustrated in the drawing, is formed of the usual sill 1, plate 2 and studs 3. Joists 4 and rafters 5 may be supported in the usual manner. This framework may be constructed of wood, concrete or steel. If the joists and rafters are made of wood, the ends which project into the wall may be covered with reinforcing mesh and cement mortar as shown at 7 (for the joists) in order to make the wall fire resistant, or they may be completely covered with reinforcing mesh and cement mortar in order to make the structure substantially fireproof. In the figures I have shown the joists covered only where they project into the wall while the rafters are shown completely covered. The joists may be supported by angle pieces or straps 6. Various braces or struts 8, tie rods 9 and furring rods 15 may be employed to strengthen the framework. The furring rods 15 attached to the studs hold the reinforcing mesh away from the studs, and act as convenient tie rods for the mesh.

The framework may be supported above a foundation 10 by metal spacing elements 11 between which may be placed a layer of cement mortar, or the reinforcing mesh may be continued beneath the sill as shown in Fig. 2. After the framework is mounted, it may be covered on both faces with reinforcing mesh 12. This reinforcing mesh may be of various types. For the purpose of my invention even a fine mesh woven fence wire can be employed. The reinforcing mesh may be extended beneath the joists to form a ceiling and, if desired, a strip can also be extended above the joists 4 and beneath the usual flooring. It is also desirable to extend the reinforcing mesh beneath and above the rafters. Both the roof and the floors of the building can be made of the same general construction as the walls of my invention. In fact the term "wall" as used in the specification and claims is intended to include these structures.

Before placing the reinforcing mesh as described, any reinforcement which is mounted inside the space left between joists is coated with cement mortar. After the reinforcing mesh is applied the wall is ready for the introduction of the insulating material shown at 13. The insulating material most suitable for the purposes of my invention is of a well defined type. Finely powdered material is not usually desired nor is material in large pieces or having long fibers. If materials of the nature of straw are employed they should be comminuted. The best material with which I am now familiar is peat moss or sphagnum moss which can be readily purchased on the market. The most advantageous granulation to be employed is somewhere between the usual "buckwheat" and "egg" sizes used for coal. I usually refer to this as "lumpy-form" material. Coarse sawdust and shavings can be employed, as well as coarse or crude asbestos, rock wool, cork scrap, etc. The mesh of the reinforcement can be adapted to the size of the insulating material employed.

The mesh of the reinforcement should be sufficiently fine as to retain the bulk of the insulation but large enough to enable some of the material adjacent the reinforcement to be removed by mechanical action such as brushing or by running the nozzle of a vacuum pipe over the surface of the mesh, for example. Any mechanical method which results in the removal of a layer of insulation adjacent the reinforcement mesh can be used. Owing to the support of the insulating material back of the cement a more open type of reinforcing mesh can be employed in my invention than is usual. This enables an important saving in the price of the mesh. For example, ordinary fine mesh woven fence wire would be entirely unsuitable for use in the ordinary construction since a large part of the cement would fall off the mesh and into the inner space between walls. But I have employed a single layer of chicken wire with complete success.

In introducing the insulating material I generally leave an opening in the top of the reinforcement and tamp the material lightly into place. Any bulging of the reinforcement should be avoided and, if desired, a skeleton framework can be used to prevent this. After the insulating material is all in place the opening in the reinforcement may be closed. At this time it is advantageous to remove the layer of insulating material adjacent the reinforcement mesh. This is especially true if the insulating material is finely divided. If large pieces are employed, there is usually sufficient space left between the pieces to provide for the interlocking engagement between the cement coating and the insulation required in my invention. With peat moss I usually use a coarse broom or brush and work this over the surface of the reinforcement mesh until the fines next to the mesh are removed. The structure is now ready for the application of the cement facing.

The coating of cement mortar, shown in the drawing at 14, may be applied by trowel or by cement gun, directly to the reinforcing mesh. The terms "cement" or "cement mortar" as used in this application are intended to include mixtures of cement, plaster of Paris and/or lime with sand and with other additions such as pigments, if desired. A mixture of 1 part Portland cement with 3 parts of sand is advantageous.

In applying the coating of cement in my application, care should be taken to force the cement as far as possible through the reinforced mesh and into the interstices between the individual pieces of insulating material. This tends to pack the insulation. The result obtained is an interlacing or an interlocking of the cement coating with the insulating material. This is illustrated in Fig. 4, wherein it is shown that particles of the insulation 13 are actually imbedded in the cement layer 14.

The interlocking engagement effected between cement and insulation effectively obviates any settling of the insulating material. This forms an important feature of my invention. I have torn down walls constructed in accordance with my invention, having insulating layers as thick as four inches, without finding the slightest indication of any settling of the insulation. I have found, in fact, that fully an inch thickness of insulation clings to the cement coating, much of which can only be removed by a vigorous brushing. Many pieces of insulation still remain imbedded in the surface of the cement after such a treatment. This interlocking engagement between cement side walls and insulation forms an effective seal at this point against rodents and prevents any continuous air space. The elimination of all continuous air spaces throughout the mass of insulating material is highly important in preventing the rapid spread of fire.

With the above described type of construction the framework bears most of the weight of the upper floor or floors and the roof, much as is done in the usual frame house or in the reinforced concrete framing of the modern brick faced building. But in the present instance the reinforced cement wall on each face of the studding gives a greater support and stiffening than is obtained in prior structures. For this reason it is possible to use studding which is placed much further apart than is customary in frame buildings. I have successfully employed studding from six to eight feet from center to center, for example.

Where the studs are placed more than two feet apart, it is usually advantageous to tie together the two sheets of reinforcing mesh, on opposite sides of the studs, by means of wire stirrups 16 placed at intervals of 12 to 16 inches, for example. These stirrups prevent the bulging of the mesh by the insulating material.

The thickness of the cement side walls of my invention may be adapted to the type of structure desired. For the ordinary house a half inch thickness or even somewhat less is usually sufficient. This can be increased to one inch or more for larger structures. The resiliency of the material employed for heat insulation tends to strengthen and support the cement side walls and this enables a thinner wall to be employed than otherwise might be required.

After application and setting of the cement, the wall is completed. This wall, as described, comprises one sill, one plate and one row of studs, the studs being connected on their inner and outer faces by continuous strips or sheets of reinforcing material. Between these sheets of reinforcement and the studs there is a layer of insulating material in loose form and on the outer surfaces there are layers of cement, one half inch or more in thickness, these layers of cement being in direct contact with the insulating layer by means of their jagged irregular inner surfaces. Door and window casings can be placed in this wall as desired. The reinforcing mesh and the cement coatings may completely inclose the sills, plates, joists and rafters and may make contact with the foundation, ceiling, floors, etc., thus completely sealing the framework and the insulating layer to the entrance of vermin and from any outer contact with fire.

As mentioned previously the floors and roof may be constructed in the same manner as has been described for the walls. Wood floors and roofing can be laid over the top of the upper cement layers. Otherwise the upper cement surface may be omitted and the usual wood flooring and roofing substituted. The insulating value of the structure will not be greatly reduced by this latter method but the resistance to fire and vermin will be considerably reduced.

The insulated wall of my invention is both damp and frost proof. In experiments I have soaked sections of my wall construction in water for sixty hours or more, thereafter subjecting them to freezing temperatures. No damage whatever was caused by this treatment and no development of cracks took place.

As a wall coating, for the interior of a house, cement is much more durable than plaster. However, it has never been considered feasible to paint or paper the inside surfaces of the usual type of concrete or cement wall because of their tendency to conduct moisture, thus causing the paint or paper to blister. I have found that the concrete surface walls of the present invention do not suffer from this defect. I have also found that, when newly constructed, these surface walls dry out with great rapidity which enables new buildings to be occupied much sooner than is the case of other constructions. When wet with rain or otherwise the walls of my construction dry out very rapidly. This removes one of the principal objections to buildings constructed of cement or concrete blocks, for example. If desired, the cement surface walls of my invention can be constructed of water-proof cement. But I have found that this is not necessary for ordinary purposes.

I attribute the quick drying properties of my walls to the absorbent properties of the insulating materials employed. On account of this tendency of the insulation to absorb moisture it is necessary to sprinkle the freshly applied cement coatings for several days to prevent its curing too rapidly. Peat moss, which I usually employ as an insulating material, has about the same absorptive properties as absorbent cotton. Another advantage in using this material is that there is no tendency to heat or to mold when moist. Moisture is always liable to seep through cement walls to some extent.

The walls of my invention are highly sound proof and exceedingly light in weight. Sphagnum moss weighs only 13.5 pounds per cubic foot when compacted in a bale even when containing as high as 25 per cent moisture. On this basis 212 cubic feet, or 2862 pounds of moss would be sufficient for a four inch layer of insulation for the walls and ceiling of a room 9 x 14 x 12 feet. As a matter of fact, the actual weight of moss required for such a room has been found to be about one third less than this calculated value, due to the smaller compression employed in the wall structure as well as to the fact that the moisture content usually ranges from about 8 to 10 per cent rather than the 25 per cent of the example.

If desired the insulating material used in my invention can be rendered fireproof by chemical treatment before use. A mere soaking in ammonium sulfate, for example, followed by drying will render the material sufficiently fireproof for all purposes. As a matter of fact the peat moss which I frequently use is already quite fire resistant when compressed as it is in my invention. When a red hot bar is applied directly to the moss insulation only a slow smoldering takes place.

Peat or sphagnum moss is an excellent heat insulator. In fact among the insulators commonly used in similar construction, this moss ranks next to hair felt and rock wool which are only slightly better heat insulators. Suitable peat moss is found in this country in enormous quantities and scattered over wide areas. In fact this moss appears to be one of our largest natural resources which has, as yet, been scarcely touched.

The radiation of heat from the average house can be reduced from 25 to 50 per cent by the use of the construction of my invention. The cost of construction is small. Important savings can be made in the cost of the heating plant and in fuel requirements. Houses constructed according to my invention are warmer in winter and cooler in summer than are more costly houses of commonly employed construction. The walls of this invention are strong, durable, fire resistant, rodent and vermin proof and require a minimum of upkeep.

Various modifications can be made in the construction of walls in accordance with my invention. It is obvious of course, that my wall construction is adapted for many other purposes besides the walls, floors and roofs of buildings. Advantage may be taken of the heat insulated construction of the present invention in the building or the insulating of refrigerators, thermostats, heating vats, steam boilers and the like.

In fact my invention is adapted to be used wherever heat insulation is desired.

What I claim is:

1. In the construction of heat insulated walls, the process which comprises erecting a wall framework, covering said framework on at least two sides with sheets of reinforcing mesh, filling the space between said sheets of reinforcing mesh with a heat insulating material in loose form and subject to packing, and applying a layer of cement over said reinforcing mesh in such manner that a substantial portion penetrates into said insulating material thereby forming an interlocking engagement between said material and said cement, whereby packing of said insulating material is prevented.

2. In the construction of heat insulated walls, the process which comprises erecting a framework of studs, sill and plate, covering said framework on at least two sides with sheets of reinforcing mesh, filling the spaces between the said studs and said sheets of reinforcing mesh with granular fibrous, insulating material in loose form and covering said mesh with a coating of cement in such manner that an interlocking engagement is formed between said cement and said insulating material, whereby packing of said insulating material is prevented.

3. The process of claim 2 in which the insulating material is peat moss.

4. An insulated wall comprising a framework, sheets of reinforcing mesh covering said framework on at least two faces, a layer of insulating material between said sheets of reinforcing mesh and a concrete coating supported by said reinforcing mesh in interlocking engagement with said insulating material.

5. An insulated wall comprising a framework of studs, sill and plate, sheets of reinforcing mesh covering said framework on at least two faces, a layer of loose insulating material between said studs and said sheets of reinforcing mesh and a concrete coating covering said reinforcing mesh and in interlocking engagement with said insulating material.

6. The construction of claim 4 in which the insulating material is peat moss.

7. The construction of claim 5 in which the insulating material is peat moss.

8. An insulated wall comprising a framework of studs, sill and plate, sheets of reinforcement covering said framework on at least two faces, a layer of insulating material between said studs and said sheets of reinforcement, the said insulating material being of a granulation between buckwheat and egg size and the average granulation being somewhat greater than the mesh of said reinforcement, and a layer of cement covering said reinforcement and in interlocking engagement with said insulating material.

9. In the construction of heat insulated walls, the process which comprises erecting a wall framework, covering said framework on at least two sides with sheets of reinforcing mesh, filling the space between said sheets of reinforcing mesh with a heat insulating material in loose form and subject to packing, removing a layer of said insulating material adjacent to said reinforcing mesh, applying a layer of cement over said reinforcing mesh in such manner that a substantial portion penetrates into said insulating material thereby forming an interlocking engagement between said material and said cement, whereby packing of said insulating material is prevented.

10. In the construction of heat insulated walls, the process which comprises erecting a wall framework, covering the framework on at least two sides with sheets of reinforcing mesh, filling the space between said sheets of reinforcing mesh with peat moss, and applying a layer of cement over said reinforcing mesh in such manner that a substantial portion penetrates into said peat moss, thereby forming an interlocking engagement between said moss and said cement whereby packing of said peat moss is prevented.

ROY R. GRAVES.